(12) United States Patent
Duoibes

(10) Patent No.: US 9,611,182 B2
(45) Date of Patent: *Apr. 4, 2017

(54) FERTILIZER PRODUCTS AND METHODS

(71) Applicant: Albert R. Duoibes, East Grand Rapids, MI (US)

(72) Inventor: Albert R. Duoibes, East Grand Rapids, MI (US)

(*) Notice: Subject to any disclaimer, the term of this patent is extended or adjusted under 35 U.S.C. 154(b) by 9 days.

This patent is subject to a terminal disclaimer.

(21) Appl. No.: 14/464,879

(22) Filed: Aug. 21, 2014

(65) Prior Publication Data

US 2015/0052959 A1    Feb. 26, 2015

Related U.S. Application Data

(60) Provisional application No. 61/870,118, filed on Aug. 26, 2013.

(51) Int. Cl.
| | | |
|---|---|---|
| C05F 5/00 | (2006.01) | |
| C05F 11/00 | (2006.01) | |
| C05F 11/02 | (2006.01) | |
| C05B 17/00 | (2006.01) | |
| C05C 5/00 | (2006.01) | |
| C05D 9/02 | (2006.01) | |

(52) U.S. Cl.
CPC .............. C05B 17/00 (2013.01); C05C 5/00 (2013.01); C05D 9/02 (2013.01); C05F 5/00 (2013.01); C05F 11/00 (2013.01)

(58) Field of Classification Search
None
See application file for complete search history.

(56) References Cited

U.S. PATENT DOCUMENTS

| | | | |
|---|---|---|---|
| 8,431,551 B2 | 4/2013 | Duoibes et al. | |
| 8,597,395 B2* | 12/2013 | Goodwin | 71/64.1 |
| 2007/0039364 A1* | 2/2007 | Gordon | 71/11 |
| 2011/0053771 A1* | 3/2011 | Goodwin | 504/100 |
| 2011/0077155 A1* | 3/2011 | Goodwin | 504/101 |
| 2011/0209510 A1* | 9/2011 | Mora et al. | 71/23 |
| 2012/0090365 A1* | 4/2012 | Ersek et al. | 71/7 |
| 2012/0260706 A1* | 10/2012 | Vyrodov | 71/23 |
| 2013/0104612 A1* | 5/2013 | Erro et al. | 71/24 |
| 2014/0260466 A1* | 9/2014 | Rehage | 71/23 |

OTHER PUBLICATIONS

Barnhart, Laura Belle, "Mineralogic Study of Sediments from Nearshore Cat Island, Mississippi," Thesis, Mississipi State, Mississippi, May 2003.

Thornton, Ralph M., "Soil Survey of Smith County, Mississippi," Natural Resources Conservation Services.

* cited by examiner

*Primary Examiner* — Wayne Langel
(74) *Attorney, Agent, or Firm* — Mitchell Intellectual Property Law, PLLC

(57) ABSTRACT

Fertilizer is made by reacting fossilized organic matter (FOM) with saccharides, preferably waste saccharides.

15 Claims, 2 Drawing Sheets

FERTILIZER PRODUCTS AND METHODS

CLAIM OF PRIORITY

This is a claim for priority to provisional patent application Ser. No. 61/870,118, entitled FERTILIZER PRODUCTS AND METHODS, filed Aug. 26, 2103.

FIELD AND BACKGROUND OF THE INVENTION

The present invention related to fertilizers, methods of making them, and their uses.

SUMMARY OF THE INVENTION

In the present invention, a fertilizer is made by reacting fossilized organic matter (FOM) with saccharides, preferably waste saccharides.

BRIEF DESCRIPTION OF THE PREFERRED EMBODIMENTS

Introduction

Figure 1:
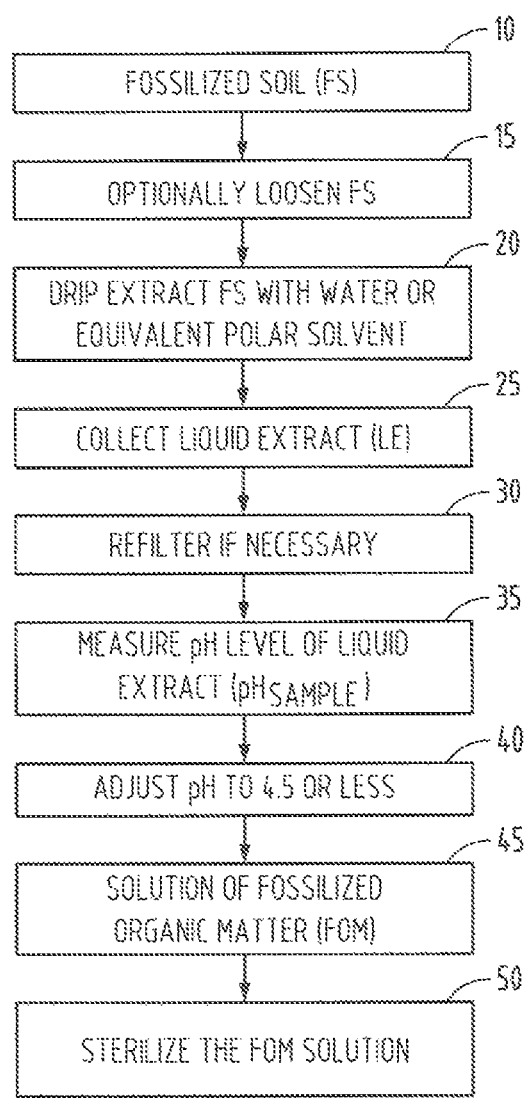
FIG. 1 illustrates the process of extraction of fossilized organic matter (FOM) from fossilized soil (FS)

The term "fossilized organic matter" (FOM) as used herein refers to organic matter derived from fossilized soil. The fossilized organic matter is derived from the fossilized soil by a process of solvent extraction, with water being the preferred solvent. The extracted fossilized organic matter is optionally sterilized, depending on the intended uses for the fertilizer to be made. Iron contained in the FOM is preferably complexed with phosphate, in the form of iron (III) phosphate, thereby rendering it insoluble to slightly soluble in water, depending on pH. The iron thus complexed may optionally be removed from the fossilized organic matter prior to reacting it with saccharides. The fossilized organic matter thus extracted, and optionally purified and/or optionally treated to remove iron, is reacted with saccharides, preferably waste saccharides, to form a fertilizer. The fertilizer may then be blended with other fertilizer ingredients such as additional phosphates, additional nitrates, and additional organic matter.

Fossilized Soil Selection

The term "fossilized soil" refers to soil containing plant organic material in which the cell walls and fibrous material making up plant material has been removed, leaving behind cellular cystosol material, including without limitation, crystalline (shales) organic mineral material, amino acids, saccharides, enzymes, cellular salt complexes and other as yet unidentified components that can be solubilized or colloidalized in water, and thereby water extracted from the fossilized soil. The fossilized soil preferably has a significant lignite and Leonardite component in it. The organic material contained in the fossilized soil can be said to have been fossilized, that is to constitute fossilized organic matter (FOM).

The fossilized organic matter is fossilized plant material, including plant breakdown products and/or plant breakdown byproducts. The "organic matter" may include those decomposition products which may be formed when plant material is mixed with solid to promote plant matter breakdown when left in such soil over enough time to form rich soils. The plant material in such soils may have become "fossilized" over the years under natural compressive "forces" or volcanic or tectonic events, and may have the beneficial properties and uses of preserving plant material in "fossilized" form.

Eventually, accumulated plant materials disintegrated and are broken down by the natural biological processes associated with earthen microflora and microfauna found in soils in combination with the other forces described herein. Accordingly, some soils may be rich in plant materials while others may not be so enriched. For example, a surface layer of desert sand (e.g., sand from the hottest, most and least hospitable part of the Sahara Desert at its most severe waterless spot; or desert sand from an equally inhospitable location elsewhere) would likely be considered soil poorly enriched by plant material.

The preferred soils are those soils that are rich in (or richer in) the quantity, age and/or type of plant material, plant breakdown products and/or plant breakdown byproducts present therein, referred to herein as fossilized organic material (FOM). Without being bound by theory, the supply of plant material present in the soil may continually (or may continuously) be undergoing breakdown in the presence of the microbial life (e.g., by way of one or more of bacteria, fungi, yeast, mold etc.) living (or present) in the soils under the conditions the soil was exposed to over the course of its geographic history. It is also possible that the breakdown of plant material into plant breakdown products and byproducts may be enhanced under certain soil conditions including, but not limited to, water content, salt type(s), mineral content, elements present, metals presents, other soil constituents present or absent, soil pH, clay content, soil type, soil porosity, age of soil, depth of soil sample, temperature, pressure, sunlight, duration of day, climate zone, extent of aerobic or anaerobic surroundings, the quantity, any changes in one or more of the above over time, and/or some other parameters including any combination or sub-combination of any of the above.

The "organic matter" is itself "fossilized organic material." Such "fossilized organic material" in question may be obtained from fossilized soil (FS) samples containing breakdown products and breakdown byproducts of disintegrated plant material within the soil. Preferably, the fossilized organic material is plant material. While the fossilized organic material may possibly contain some non-plant organic material at some point in time, it is preferably degraded and preferably constitutes less than 10% by volume of the organic material present.

Exemplary fossilized soils are found in the St. Bernard Delta Basin and the LaFourche Delta basins formed by the Mississippi River from about 1800 to about 4600 years ago (Mineralogic Study of Sediments from Nearshore Cat Island, Miss., pp. 14 and 24, Laura Belle Barnhart, a thesis submitted to the Faculty of Mississippi State University, 2003). Another suitable source of FS is the Vicksburg Group geologic formation, and especially the Bucktoona Clay unit (Soil Survey of Smith County Miss., pp. 11 and 150, Ralph M. Thornton, 2001). Layers of FS can typically be found at 10 to 100 feet of depth.

In one more specific embodiment, the (FS) can be found are centrally located at Mt. Olive, Miss. Locations that may be used for (FS) collection are situated on tow areas having approximately 20+ acres in their central portion. The first of these particular areas where the fossilized soil (FS) may be collected is at longitude 89°39'13"W and latitude 31°45'24"N or within a radius of about 1,000 acres in any direction from the parcel's center. The second particular area where the fossilized soil (FS) may be collected is at longitude 89°39'13"W and latitude 31°45'24"N or within a radius of about 1,000 acres in any direction from the area center.

Fossilized Organic Matter Plant Type

Optionally, the fossilized organic material (from soils of interest) may include: grasses, weeds, any leaf, any flower, any seed, any seed pod, any outer plant or fruit layer, bark, juice, pulp, outer scales, needles, thorns, petals, flower stamen's, pollen, stems, branches, wood, limbs, connective tissue, sap syrup, roots, or other plant parts, etc., irrespective of whether the plant is alive and growing in open-air, underwater, underground or elsewhere so long as such fossilized parts are of a species or of a species relying on photosynthesis or requiring sunshine to grow, which would generally be a vegetable, a grass, a plant, a fruit, a root, a seed, a bean, a string bean, corn, corn husk, husk, a leaf, a branch, a bark, an under-layer or internal part of any plant thereof, and/or any combinations thereof.

Extraction of Fossilized Organic Matter from Fossilized Soil

With respect to isolating, separating or extracting "fossilized organic matter" from "fossilized soils," the extraction solvent is a polar solvent. Examples of such solvents include, but are not limited to, distilled water, de-ionized water, tap water, water of any quality sufficient to conduct sufficient extraction without materially interfering with commensurate operational efficiency. Water locally collected from the same site or near the site where the soil sample is collected (or is intended to be collected from) may also be used. The extraction is preferably conducted in water at a slightly acidic pH of less than about 7, preferably from about 4 to about 7, more preferably, at a pH of about 5-6.

The water may be mixed with a co-solvent. The co-solvent may be a water-miscible co-solvent better suited to extracting the sought solid constituent(s) of interest. Co-solvents can include organic solvents such as, but not limited to, alcohols (methanol, ethanol, and the like), dimethylsulfoxide (DMSO), N,N-dimethylformamide (DMF), acetonitrile, tetrahydrofuran (THF), p-dioxane, and the like.

The water may be mixed with a co-solvent. The co-solvent may be a water-miscible co-solvent better suited to extracting the sought soil constituent(s) of interest. Co-solvents can include organic solvents such as, but not limited to, alcohols (methanol, ethanol, and the like), dimethylsulfoxide (DMSO), N,N-dimethylformamide (DMF), acetonitrile, tetrahydrofuran (THF), p-dioxane, and the like.

FIG. 1 illustrates the process of extraction of fossilized organic material from the fossilized soil. The process begins with a fossilized soil at 10. Optionally, the fossilized solid may be loosened to facilitate fluid flow through the soil rather than over it (15).

A drip extraction process is carried out using an appropriate solvent (e.g., water, distilled water, ground water, ionized water, sterile water, etc.) (20). The extraction solvent is poured on top of the fossilized soil in a batch process, or is mixed with the fossilized soil in a continuous process, and the liquid is passed through a sized filter after passing through or being mixed with the fossilized soil. The filter is sized to allow the passage of colloidal material, as well as the soluble material, as such colloidal material may contain desirable ingredients. To the extent necessary, the liquid is refiltered to eliminate undissolved and non-colloidal solids. The liquid extract (LE) is collected as noted at 25, and its pH level is measured ($pH_{sample}$) as noted at 30. The liquid extract contains the FOM, and indeed is a solution/colloidal suspension of the FOM.

Any suitable from of extraction other than drip extraction may be used. Where an equivalent of extraction is available, then such equivalent may be used if appropriate as would be recognized by one of ordinary skill in the art provided with the benefit of the disclosure of this application.

The time interval for measuring the pH of the drip extracted liquid extract (LE) may be accomplished by continuous monitoring of the drip extraction collected liquid extract (LE)—for example by use of a pH meter connected to a pH probe ultimately connected to a monitoring computer or may be monitored manually or my use of pH paper and color change or by pH indicator and color change or an equivalent of the same. The pH monitoring could be a certain intervals of time rather than continuous monitoring as could be accomplished by a computer. The purpose of monitoring the pH of the liquid extract is to confirm that its pH has fallen to an acidic level, namely less than about 7. This is an indication that the proper fossilized organic material is being extracted.

Once the extraction is complete, it is important to take a final pH measurement. If the final pH is above 4.5, the pH is preferably adjusted to 4.5 or less, since the reaction of the fossilized organic matter (FOM) with saccharides is preferably conducted in solution/colloidal suspension/slurry at a pH of 4.5 or less.

Optional Sterilization

Sterilization of the derived fossilized soil organic matter may or may not be desirable before reaction with waste saccharide material. The liquid extract may be sterilized to yield a sterilized (LE) denoted herein as (SLE), at 50.

Preferably, sterilization may be accomplished by heating, filtration, UV light, pasteurization or by all methods other than by pasteurization. Sterilization may not be possible by use of a 0.22 micron filter because it may be that the LE contains ingredients that would not pass through a 0.22 micron filter while still keeping the desirable particulate matter with the (LE). If necessary, it may be desirable to use a 0.22 micron filter, and then to separately collect any solids and heat those solids to a sufficient temperature and for a time to guarantee sterility of the solids so collected via use of a 0.22 micron or other suitable filter or filters. Thereafter, once the solids are chemically or heat treated to achieve sterility of the solids so as to render any pathogenic or other bacterial, microbial, viral, toxic or other contents harmless, such solids could be recombined with the filter sterilized (LE) using a 0.22 micron filter. In such manner, any heat labile dissolved contents of the LE could be spared heat or chemical degradation by heat of chemical sterilization reserved just for solids collected.

By such sterilization process, both dissolved heat labile or chemical labile (LE) constituents could be sterilized via filtration with a 0.22 micron filtration method. And solids that are not heat or not chemical treatment labile could be recombined with the sterilized (LE) obtained via 0.22 micron filtration. In such manner, those desirable solids could be preserved and sterilized if possible and those desirable heat labile or chemical labile dissolved (LE) constituents could be preserved for use in the form of a more potent or desirable (SLE). The relevant point being that whatever sterilization techniques are suitable may be used if so desired.

Of course, if the sterilization procedure is too expensive compared to another method or is faster compared to another equally suitable method, them one may opt for the best, cheapest, most efficient of methods or some combination of the above to reduce cost and increase productivity. In effect, one may use a less elegant sterilization method if such method accomplished the sought objective. Ultimately, heat sterilization may be utilized so long as conducted under conditions sufficient to sterilize without the excessive loss of stability. The resulting sterilized (LE) is denoted as (SLE).

Figure 2:
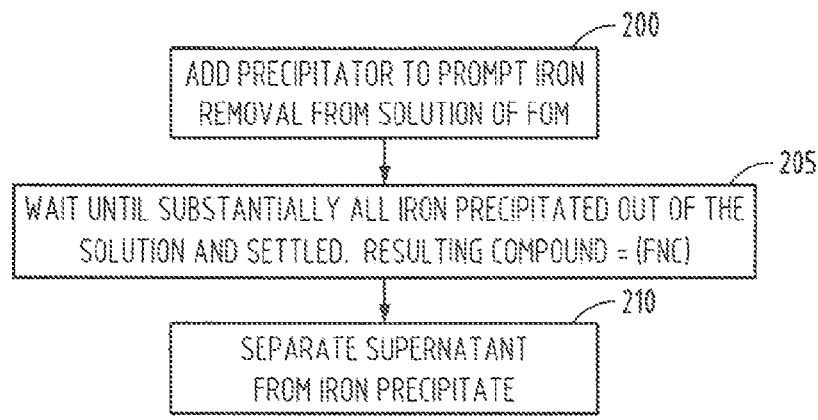
FIG. 2 outlines a process for removal of iron from the FOM solution.
Figure 3:
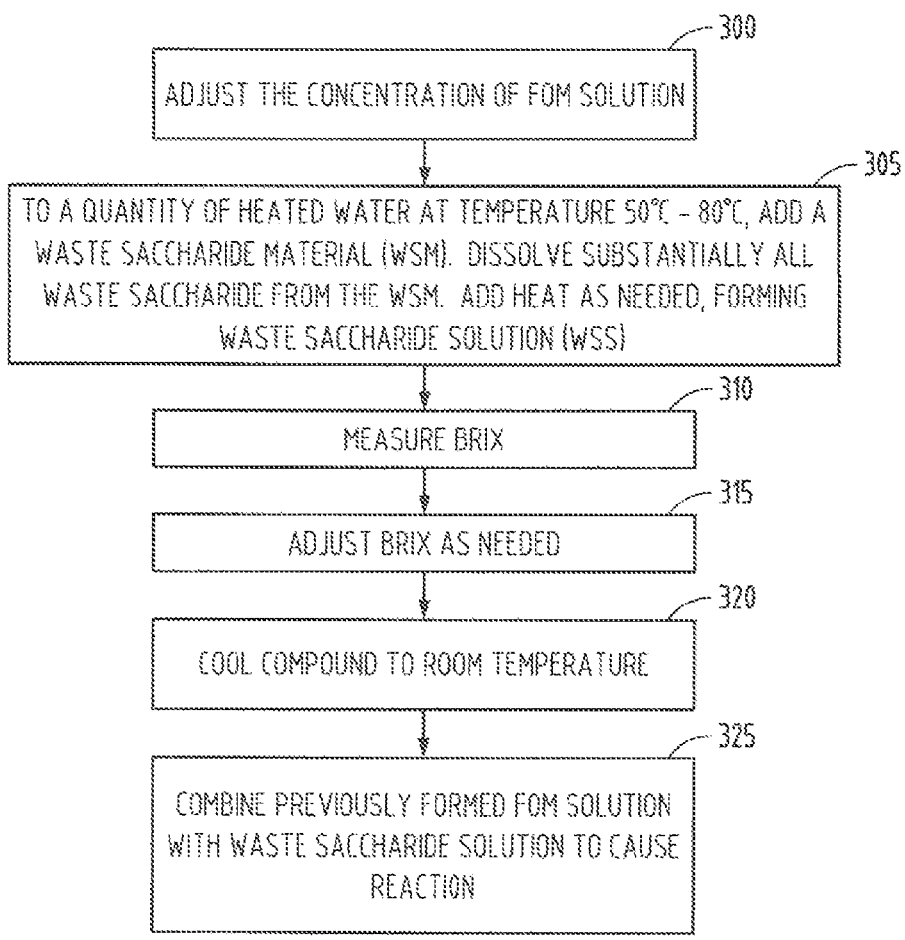
FIG. 3 outlines the process for reacting the FOM with waste saccharides.

Also, sterilization may be conducted at (50) or at any other point along the processes of FIG. 1, 2, or 3 so long as the desired product is obtained at the end. Where sterilization is unnecessary, the process at (50) could be skipped altogether.

Complexing and Optional Removal of Iron

Iron is preferably complexed with phosphate, in the form of Iron (III) phosphate, thereby rendering it insoluble to slightly soluble in water, depending on pH. The iron thus complexed may optionally be removed from the fossilized organic matter prior to reacting it with saccharides. However, there is an advantage to leaving the insoluble iron complex in the extracted fossilized organic matter (FOM). Iron (III) phosphate is one of the few molluscicides approved for use in the practice of organic farming. Unlike the older metaldehyde, it is non-toxic to pets and wildlife. FIG. 2 outlines a process for removing iron from the fossilized soil derived organic matter. The FOM solution as extracted is placed in a first precipitator (200) and a soluble phosphate or other precipitant is added to precipitate the iron. When substantially all of the iron has precipitated out of the solution and settled (205), the supernatant is separated from the iron precipitate, as indicated at (210). While most of the iron will thus be removed, some complexed iron may still remain in the FOM solution.

The Waste Saccharides Materials

The term waste saccharides refer to waste materials containing saccharides. Fertilizer can be made by reacting the FOM with any saccharide material. However, the use of saccharide containing waste material is preferred. Such waste materials may contain materials other than saccharides, so long as they are not poisonous or would interfere negatively with the reaction between FOM and the waste material. Thus waste from refining sugar, fructose, molasses, corn starch, and the like can be used. Waste from fruit infusion, bagasse (substances that remain after juice is extracted from sugar cane), corn stover, and the like can be used. Saccharide containing waste from food and agriculture manufacturing, processing and handling can be used. Saccharide sources disqualified from human use can be used. Cellulosic biomass such as grass, agricultural residues, used paper, paper sludge, cotton fibers, and rice straw can be used. Waste with higher saccharide content will generally be more efficient.

Reacting the Fossilized Organic Matter with Waste Saccharide

The fossilized organic matter which is reacted with the waste saccharide may be sterilized or unsterilized, as desired by the circumstances. Similarly, it may be iron free or it may include complexed iron.

The process is carried out in solution/slurry at a pH of 4.5 or less, using from about 1:50 to about 1:2500, more preferably 1:100 to 1:2000, more preferably 1:200-1:1500 parts fossilized organic matter to parts waste saccharides. The "parts" referred to are parts as solids, even though reaction is conducted in solution/suspension/slurry. The reaction is preferably conducted at room temperature, preferably in a temperature range of from about 15° C. to about 30° C. The reaction is conducted in air or some other nitrogen containing environment. Optionally, different forms of light may be employed to enhance particular reactions which may be desired. Similarly, other reactants could be included in the reaction mixture to obtain desired end products.

The volume of liquid in the liquid extract containing the fossilized organic matter is adjusted so that the concentration of FOM is from approximately 10 to about 80%, preferably about 20 to about 40%, and most preferably about 25 to about 35%. (FIG. 3 at 300) Separately, a quantity of water is heated to a temperature of about 50-80° C. (305). Then a waste saccharide material is added to the heated water (Qw) at a ratio of one gram of waste saccharide for every 2 millimeters of water (305). The saccharide is preferably substantially dissolved or extracted from the waste saccharide material, and heat and an emulsifying agent may be added to aid in dissolution to form the waste saccharide solution (WSS) (300). Flocculants may be added to help precipitate out the non-saccharide components of the waste material. The Brix level is measured (310). It is preferably between about 20 and 80, more preferably about 35-67, most preferably about 50-55. If it is not, an amount of water or waste saccharide material should be added as needed (315) until the Brix level is within this approximate range. Once the Brix level is attained, the waste saccharide solution (WSS) solution should be cooled to room temperature (320).

The previously formed FOM solution/colloidal suspension (300) is combined with the WSS, in air or some other nitrogen environment, in sufficient quantity to cause or initiate a reaction. (325) Typically in a commercial batch, substantial fertilizer is created in about 24 hours.

Additional Fertilizer Ingredients the resulting product can be used as a fertilizer as is. Optionally, other fertilizer materials such as, but not limited to, phosphates, nitrates, minerals, pH balances, additional organic matter and/or other soil builders can be added to the fertilizer to enhance its usefulness for particular applications.

A Comparative Study

A fertilizer solution made in accordance with the present invention was tested against a commercial fertilizer with the results shown in Table 1 below. One teaspoon of the test fertilizer solution and one teaspoon of the dry commercial fertilizer were each dissolved in one gallon of water. Broccoli and basil (Genovese variety) were planted from seed as indicated and the planted seeds placed under a grow lamp. On days 2, 5-7, and 9, the number of cells sprouted were counted for each plant and each fertilizer. On days 12-14, 16, 19 and 21, the height of the plants were measured, and the average height recorded. In the case of both vegetable, the number of cells sprouted, and the average height to which the plants had grown as of each day recorded, were significantly greater for the plants fertilized with the test fertilizer than for those fertilized with the commercial fertilizer.

TABLE 1

| | Test Fertilizer (1 tbsp liquid solution/gallon) | | Commercial Fertilizer (1 tbsp dry powder/gallon) | |
|---|---|---|---|---|
| Day | Broccoli | Basil (Genovese) | Broccoli | Basil (Genovese) |
| 0 | Planted (2 per plug) | Planted (3-4 per plug) | Planted (2 per plug) | Planted (3-4 per plug) |
| 1 | N/A | N/A | N/A | N/A |
| 2 | Cells sprouted: 9 | Cells sprouted: 9 | Cells sprouted: 7 | Cells sprouted: 9 |
| 3 | | WEEKEND | | |

TABLE 1-continued

| | Test Fertilizer (1 tbsp liquid solution/gallon) | | Commercial Fertilizer (1 tbsp dry powder/gallon) | |
|---|---|---|---|---|
| Day | Broccoli | Basil (Genovese) | Broccoli | Basil (Genovese) |
| 4 | | | | |
| 5 | 17 cells | 14 cells | 14 cells | 12 cells |
| 6 | 17 cells | 14 cells | 14 cells | 12 cells |
| 7 | 17 cells | 17 cells | 16 cells | 13 cells |
| 8 | | | | |
| 9 | 18 cells | 18 cells | 16 cells | 17 cells |
| 10 | WEEKEND | | | |
| 11 | | | | |
| 12 | 33.63 | 17.50 | 30.38 | 14.61 |
| 13 | 42.75 | 24.19 | 33.50 | 17.22 |
| 14 | 44.13 | 24.50 | 38.13 | 18.83 |
| 15 | | | | |
| 16 | 47.75 | 28.22 | 44.50 | 28.28 |
| 17 | WEEKEND | | | |
| 18 | | | | |
| 19 | 53.00 | 37.39 | 57.25 | 37.50 |
| 20 | | | | |
| 21 | 53.63 | 43.89 | 60.75 | 43.56 |

CONCLUSION

Thus in the preferred embodiments of the invention, various important aspects include without limitation:
1. A fertilizer formed by reacting fossilized organic matter with waste saccharides.
2. A fertilizer comprising a base material formed by reacting fossilized organic matter with saccharides, combined with one or more additional ingredients, including but not limited to the following:
  phosphates, nitrates, mineral, pH balancers, additional organic matter and/or other soil builders.
3. A method of fertilizing vegetation by applying a fertilizer made by reacting fossilized organic matter with saccharides.

Of course it is understood that the foregoing are preferred embodiments of the invention and that various changes and alterations can be made without departing from the spirit and broader aspects of the invention.

The invention claimed is:

1. A fertilizer formed by reacting fossilized organic matter with waste saccharides in a ratio of from about 1:50 to about 1:2500 parts fossilized organic matter to parts waste saccharides.

2. The fertilizer of claim 1 in which said fossilized organic matter is sterilized fossilized organic matter.

3. The fertilizer of claim 1, in which said fossilized organic matter is iron free.

4. The fertilizer of claim 1 in which said fossilized organic matter is free of plant cell walls and fibrous material and includes cellular cytosol materials, including crystalline (shales) organic mineral material, amino acids, saccharides, enzymes, cellular salt complexes.

5. The fertilizer of claim 1 in which said fossilized organic matter was extracted from fossilized soils using water at a slightly acidic pH of from about 4 to about 7.

6. The fertilizer of claim 5 in which said water was mixed with a water-miscible organic co-solvent selected from the group consisting of alcohols, dimethylsulfoxide (DMSO), N,N-dimethylformamide (DMF), acetonitrile, tetrahydrofuran (THF), and p-dioxane.

7. The fertilizer of claim in which said reaction of said fossilized organic matter with waste saccharides was conducted in one of a solution, colloidal suspension, slurry or any combination thereof at a pH of 4.5 or less.

8. The fertilizer of claim 1 in which said reaction was conducted using from 1:100 to 1:2000 parts fossilized organic matter to pans waste saccharides.

9. The fertilizer of claim 8 in which said reaction was conducted using from 1:200-1:1500 parts fossilized organic matter to parts waste saccharides.

10. The fertilizer of claim 1 in which said reaction was conducted in a temperature range of from about 15° C. to about 30° C. in a nitrogen containing environment.

11. The fertilizer of claim 10 in which light was employed to enhance said reaction.

12. The fertilizer of claim 1 in which said fossilized organic matter was reacted with said waste saccharides as a liquid containing the fossilized organic matter in a concentration of from approximately 10 to about 80%.

13. The fertilizer of claim 12 in which said waste saccharides were reacted with said fossilized organic matter as a liquid with a Brix level between about 20 and 80.

14. A fertilizer comprising a base material formed by reacting fossilized organic matter with saccharides in a ratio of from about 1:50 to about 1:2500 parts fossilized organic matter to parts waste saccharides, combined with one or more additional ingredients, selected from the group consisting of
  phosphates, nitrates, minerals, pH balancers, additional organic matter and other soil builders.

15. A method of making a fertilizer comprising reacting fossilized organic matter with waste saccharides in a ratio of from about 1:50 to about 1:2500 parts fossilized organic matter to parts waste saccharides.

* * * * *

UNITED STATES PATENT AND TRADEMARK OFFICE
CERTIFICATE OF CORRECTION

PATENT NO. : 9,611,182 B2
APPLICATION NO. : 14/464879
DATED : April 4, 2017
INVENTOR(S) : Albert R. Duoibes It is certified that error appears in the above-identified patent and that said Letters Patent is hereby corrected as shown below:

Column 2, Line 3:
"solid" should be --soil--.

Column 2, Line 34:
After "water content" insert --soil drainage, longitude and latitude of soil location, soil density, sand content, salt content,--.

Column 2, Line 39:
After "quantity," insert --and identity of microbial life active in the soil, nutrients present, nutrient quantity,--.

Column 2, Line 66:
"tow" should be --two--.

Column 3, Lines 44-50:
Delete entire paragraph as it is a duplicate of previous paragraph.

Column 8, Claim 7, Line 15:
After "claim" insert --6--.

Column 8, Claim 8, Line 21:
"pans" should be --parts--.

Signed and Sealed this
Twenty-second Day of May, 2018

Andrei Iancu
*Director of the United States Patent and Trademark Office*